(12) United States Patent
DeJesus

(10) Patent No.: US 8,006,388 B1
(45) Date of Patent: Aug. 30, 2011

(54) COMBINATION RETRACTABLE KNIFE AND SAW UTILITY TOOL

(76) Inventor: Thomas DeJesus, Londonderry, NH (US)

( * ) Notice: Subject to any disclaimer, the term of this patent is extended or adjusted under 35 U.S.C. 154(b) by 669 days.

(21) Appl. No.: 12/006,749

(22) Filed: Jan. 4, 2008

(51) Int. Cl.
*B26B 3/06* (2006.01)

(52) U.S. Cl. ........................................ 30/152; 30/162

(58) Field of Classification Search .................. 30/125, 30/152, 151, 162; D8/99
See application file for complete search history.

(56) References Cited

U.S. PATENT DOCUMENTS

| | | | | |
|---|---|---|---|---|
| 110,986 A * | 1/1871 | Lyman | ............................ | 30/163 |
| 174,417 A * | 3/1876 | Evans | ............................ | 30/162 |
| 373,580 A * | 11/1887 | Boynton | ............................ | 30/162 |
| 1,853,672 A * | 4/1932 | Dodson | ............................ | 30/162 |
| 2,651,108 A * | 9/1953 | Weems | ............................ | 30/337 |
| 2,736,960 A * | 3/1956 | Armstrong | ............................ | 30/162 |
| 2,862,296 A * | 12/1958 | Anderson | ............................ | 30/162 |
| 3,448,518 A * | 6/1969 | Sklar | ............................ | 30/162 |
| 3,660,896 A * | 5/1972 | Umholtz | ............................ | 30/162 |
| 4,578,865 A * | 4/1986 | Keller | ............................ | D8/99 |
| 4,592,140 A * | 6/1986 | Chasen | ............................ | 30/162 |
| 4,608,757 A * | 9/1986 | Eckerle | ............................ | D8/98 |
| 4,884,307 A * | 12/1989 | Flood | ............................ | 30/162 |
| 4,890,387 A | 1/1990 | Canino | ............................ | 7/18 |
| D310,474 S * | 9/1990 | Bartsch et al. | ............................ | D8/99 |
| 5,023,996 A | 6/1991 | Pape et al. | ............................ | 30/144 |
| 5,093,994 A * | 3/1992 | Karas | ............................ | 30/162 |
| 5,230,152 A * | 7/1993 | Kennedy | ............................ | 30/162 |
| 5,337,481 A * | 8/1994 | Mears | ............................ | 30/162 |
| D355,345 S * | 2/1995 | Drust | ............................ | D8/99 |
| 5,584,123 A * | 12/1996 | Chi | ............................ | 30/125 |
| 5,689,886 A * | 11/1997 | Yeh | ............................ | 30/162 |
| 5,806,189 A * | 9/1998 | Bailey | ............................ | 30/125 |
| 5,906,049 A * | 5/1999 | Butts | ............................ | 30/125 |
| 5,960,544 A * | 10/1999 | Beyers | ............................ | 30/125 |
| 6,006,433 A * | 12/1999 | Baltazar | ............................ | 30/162 |
| 6,148,522 A * | 11/2000 | Dobandi | ............................ | 30/162 |
| D435,418 S * | 12/2000 | Beyers | ............................ | D8/99 |
| 6,327,780 B1 * | 12/2001 | Bigham et al. | ............................ | 30/162 |
| 6,363,614 B1 | 4/2002 | Umstead et al. | ............................ | 30/144 |
| 6,467,173 B1 | 10/2002 | Umstead et al. | ............................ | 30/144 |
| 6,848,185 B2 * | 2/2005 | Tebo | ............................ | 30/162 |
| 7,185,435 B1 * | 3/2007 | Tseng | ............................ | 30/152 |
| D559,072 S * | 1/2008 | Fraga | ............................ | D8/99 |
| 7,340,836 B2 * | 3/2008 | Whitemiller et al. | ............................ | 30/152 |
| 7,530,131 B1 * | 5/2009 | Conrique | ............................ | 7/158 |
| 7,603,779 B2 * | 10/2009 | Rowlay | ............................ | 30/162 |
| 2004/0177514 A1 * | 9/2004 | Kaczorowski | ............................ | 30/151 |
| 2004/0187314 A1 * | 9/2004 | Johnson | ............................ | 30/162 |
| 2008/0040929 A1 * | 2/2008 | Chu | ............................ | 30/152 |
| 2011/0083326 A1 * | 4/2011 | Sullivan | ............................ | 30/162 |

FOREIGN PATENT DOCUMENTS

EP 611634 A1 * 8/1994

* cited by examiner

*Primary Examiner* — Jason Daniel Prone
(74) *Attorney, Agent, or Firm* — Joseph E. Funk

(57) ABSTRACT

A combination retractable saw and knife utility tool is disclosed that can be actuated and used by a person using only one hand. The tool has a lock to assure that an extended knife blade or saw blade will remain extended until the user of the tool releases the lock. A person may use one hand to hold, steady and manipulate a work piece that needs to be cut and/or sawed, while their other hand is used to hold and implement the combination knife and saw utility tool. The person may release the tool lock, retract one blade and extend another blade using only one hand.

4 Claims, 5 Drawing Sheets

COMBINATION RETRACTABLE KNIFE AND SAW UTILITY TOOL

FIELD OF THE INVENTION

The invention relates to a combination utility tool having both a retractable knife and saw blade that is used for cutting metal, wood, drywall, plaster and plastic.

BACKGROUND OF THE INVENTION

In the prior art there are a wide variety of tools that provide blades in which the blade is either folding or retractable. Some of these tools furnish a saw blade which is enclosed into a handle when not in use and extends out of the handle in a manner similar to a pocket knife when the tool is to be used as a saw. Some tools provide that the blade can be opened to several different positions.

Other tools that are commercially available provide blades that retract within a handle such as is found in utility knives. In these tools the blade retracts into a hollow portion of the handle when not in use and extends out of the handle when it is to be used as a knife. All of these tools are very handy for the worker. However, a worker who has need of a saw and a knife must typically carry two separate tools in their tool pouch. Carrying both of these tools along with assorted screwdrivers, hammers and other tools requires considerable room in a tool pouch and room in the tool pouch is limited.

Thus, there is a need for a compact, durable tool which can provide a worker with a combination utility tool which includes both a saw blade and a knife blade and enables the worker to saw or cut with the same tool.

U.S. Pat. No. 6,363,614 is one attempt at solving this need in the prior art. A knife blade and a saw blade are contained within a common handle of a tool. The knife blade is a standard utility knife blade, commonly available anywhere, used in prior art retractable blade utility knives. The knife blade extends longitudinally from the end of the tool handle alike other utility knives. The saw blade also extends longitudinally from the end of the tool handle. However, the saw blade is a custom blade that is not commonly obtainable anywhere. More importantly, the use of this tool requires the use of two hands. While the tool is held in one hand a lock and unlock cap 28 at one end of the tool must be turned counter-clockwise with the other hand to loosen blade 10 in order to either move the saw blade to an extended operable position or to retract it inside the tool handle. At either extreme the lock and unlock cap 28 must be turned clockwise with the other hand to lock the saw blade in that position.

U.S. Pat. No. 4,890,387 teaches a single tool having both a knife blade and a saw blade. The knife blade is a convention utility knife blade that extends longitudinally from one end of an elongated tool handle by manually sliding an actuator button on the side of the tool. This is a one hand operation. However, the use of the saw blade is a two hand operation. While the tool is being held in one hand a second hand must be used to pull the saw blade from within a slot in the side of the tool handle alike a folding pocket knife. The saw blade pivots out of the slot to be aligned with the elongated tool handle. There is no provision for replacing the saw blade.

U.S. Pat. No. 6,467,173 teaches a combination retractable saw and knife tool that is alike that taught in U.S. Pat. No. 6,363,614 and requires a two hand operation. While the tool is held in one hand a lock and unlock cap 28 at one end of the tool must be turned counter-clockwise with the other hand to loosen blade 10 in order to either move the saw blade to an extended operable position or to retract it inside the tool handle. At either extreme the lock and unlock cap 28 must be turned clockwise by the other hand to lock the saw blade in that position.

U.S. Pat. No. 5,023,996 teaches a combination retractable saw and knife device. This device also requires a two hand operation. There is a two part handle each comprising a saw blade housing and the two housings are pivotably connected at one end. A saw blade is mounted inside each housing and the blades are extended from the end of each housing/handle. Hacksaw blade 28 is deployed for use from inside its handle housing 48 by turning a knob 29 counter-clockwise to free the blade and extend it from its handle housing. Knob 29 is then used to lock blade 28 in its extended position. This two handed operation is repeated to retract hacksaw blade 28 inside its handle housing and lock it therein. A wood saw blade 31 is mounted inside the other handle housing 58 using a pair of spring loaded displaceable slides 34 and 35 having catches 36 and 37. The catches are received in notches 42 and 43 or 40 and 41 depending on whether blade 31 is extended from its handle housing or is retracted therein. Both of these blades require two hands to operate. For the hacksaw blade 28 the handle must be held with one hand while the other hand is use to turn knob 29, extract blade 28 and retighten knob 29. For the wood saw blade 31 the handle must be held with one hand while the other hand is used to squeeze catches 36 and 37 to release them from notches 42 and 43 and then to pull wood saw blade 31 from the handle.

A person who is working with or installing drywall/wallboard or other materials very often needs one hand to steady a piece of material to be cut while their other hand is used to cut the material. Therefore, a tool that requires two hands to operate is not practical. Thus, there is a continuing need for a new and improved combination drywall utility tool with knife and saw blades which addresses the unique problems associated with cutting and shaping drywall to be fastened to a support wall. More particularly, there is a need for a combination drywall knife and saw utility tool that can be actuated and used by a person using only one hand. The knife blade or saw blade can be easily extended, used, unlocked and retracted all using one hand. This leaves the person's other hand free to hold, steady and manipulate a piece of drywall while it is being cut.

Along and through one side of a prior art utility knife is a slot through which protrudes, and along which travels an actuator button. A person holding and using a prior art utility knife typically uses their thumb to first depress the actuator button and then move it along the slot through the side of the tool to expose the knife blade. When the actuator button is released the exposed knife blade is supposed to remain in its exposed position. However, too often during use the actuator button is inadvertently pressed and the knife blade retracts when the operator does not want it to. In addition, the actuator buttons have an integral spring that too often gets weak with use and being clogged up with material after continued use of the knife. When this happens the actuator button does not adequately perform its function of locking a knife blade in its extended position. Thus, there is also a need in art for a way to assure that an extended knife blade will remain locked in an extended position and will not inadvertently retract while in use.

SUMMARY OF THE INVENTION

The needs in the prior art for a combination utility tool having retractable knife and saw blades that can be actuated and used by a person using only one hand, and having a lock to assure that an extended knife blade or saw blade will remain extended until the user of the tool releases the lock, are satisfied by the present invention. A person may use one hand to hold, steady and manipulate a work piece that needs to be cut and/or sawed, while their other hand is used to hold and utilize the retractable combination knife and saw utility tool.

The utility tool is elongated and ergonomically shaped and is easily held in one hand. There is a slot through either end of the utility tool and a knife blade can protrude through the slot in one end of the utility tool while a saw blade can alternatively protrude out of the slot through the other end of the tool. Along and through a top side of the utility tool is a slot through which protrudes and along which travels an actuator button. This actuator button is alike those found on prior art utility knives, is spring loaded, and is used to manually extend either the knife blade or the saw blade through one end or the other of the utility tool. A person holding and using the utility tool typically uses their thumb to first depress the actuator button and then moves the button along the slot through the top side of the utility tool to expose the knife blade or the saw blade. When the actuator button is released the exposed knife blade or saw blade remains in its exposed position and is locked in that position. Thereafter, the actuator button alone cannot be used to withdraw the knife blade or saw blade.

When either the knife blade or the saw blade is extended through one end or the other of the utility tool the blade is held in held in its extended position by a locking mechanism. This prevents inadvertent retraction of either blade. The locking mechanism has small protrusions that extend through holes in the bottom side of the utility tool, opposite to the side through which the actuator button protrudes. There is one protruding locking mechanism for each of the two blades. The locking mechanism is shaped so that it cannot be inadvertently actuated to retract the knife blade or the saw blade. To retract the knife blade or the saw blade the locking mechanism is released and the actuator button is simultaneously used to retract an extended blade into the tool handle. The locking mechanism is released and the actuator button is depressed and moved along the slot through the side of the utility tool using only one hand, the hand that is holding the tool. When this is done the middle finger, ring finger and little finger are holding the tool while the forefinger releases the locking mechanism and the thumb depresses and slides the actuator button.

When it is desired to use the other blade within the handle of the tool, after an exposed blade is retracted, the user easily rotates the tool in their hand one-hundred eighty degrees, without the aid of their other hand, and uses their thumb to push the actuator button in the opposite direction to expose the other blade.

The knife blades used in the novel combination tool are trapezoidal shaped blades used in existing utility knives, and the saw blades used in the tool are readily available reciprocating power saw blades. This permits a wide range of saw blade types to be used, from a coarse blade to a fine metal cutting blade. In addition, the blades are available in all hardware stores.

The knife and saw blades are fastened to a carrier inside the utility tool. The carrier is moved by the actuator to extend and retract the blades. To change a knife and/or saw blade a finger operated screw on the side of the tool handle is first unscrewed by the tool user. Two handle sections of the tool then easily separate. The knife blade is easily removed and replaced in a manner known in the prior art. To remove and replace the saw blade a small saw blade retainer clip is first removed. The retainer has flexible tabs that lock the saw blade in position until the tabs retainer are depressed permitting the retainer to be removed.

DESCRIPTION OF THE DRAWING

The combination utility retractable saw and knife tool of the present invention will be better understood upon reading the following Detailed Description in conjunction with the drawings in which.

DETAILED DESCRIPTION

Figure 1:
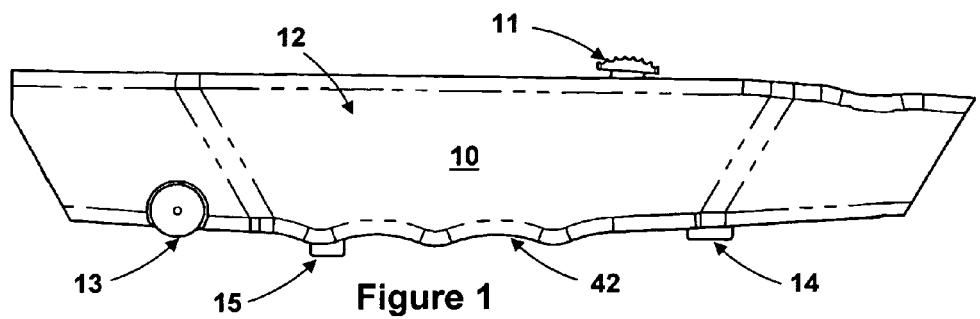
FIG. 1 shows a side view of the novel combination tool with both knife and saw blades retracted inside the handle.
Figure 3:
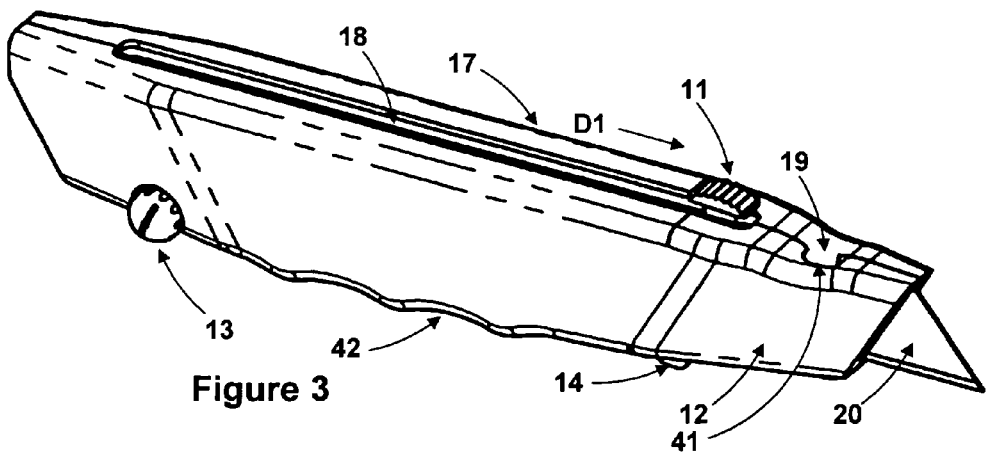
FIG. 3 shows a three dimensional view of the novel combination tool with the knife blade extended.

In FIG. 1 is shown a side view of the novel combination utility tool 10 with both knife and saw blades retracted. Tool 10 has two side pieces 12 and 17, of which only side 12 is seen in FIG. 1. Tool 10 is elongated and has ergonomically shaped grooves 42 in its bottom edge that match the positions of a person's fingers when they hold utility tool 10. On top is seen actuator button 11 which is depressed and slid to the right to extend a knife blade as shown in FIG. 3, or is depressed and slid to the lift to extend a saw blade as shown FIG. 4. Actuator 11 is shown in its neutral position where neither the knife blade nor the saw blade is extended.

Also shown in FIG. 1 is hand operated screw 13 which is used to open the two handle pieces 12 and 17 to replace the knife blade or saw blade as shown in other Figures.

On the bottom side of tool 10 are shown locking mechanisms 14 and 15. Locking mechanism 14 is used to lock the knife blade in its extended position (see FIG. 3) and must be depressed sideways (perpendicular to the page) while pushing downward on actuator 11 and sliding it to the left to detract the knife blade. Locking mechanism 15 is used to lock the saw blade in its extended position (see FIG. 4) and must be depressed sideways (perpendicular to the page) while pushing downward on actuator 11 and sliding it to the right to detract the saw blade.

Figure 2:
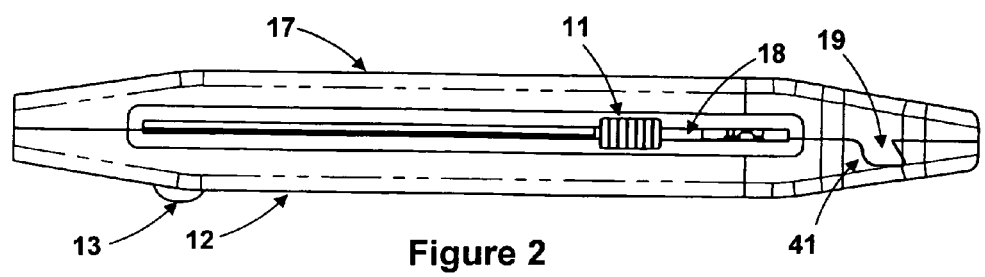
FIG. 2 shows a top view of the novel combination tool with both knife and saw blades retracted inside the handle and showing the actuator button in its operating slot.

In FIG. 2 is shown a top view of the novel utility tool 10 with both knife and saw blades retracted and showing the actuator button 11 in its neutral position. In this figure it can be seen that actuator button 11 slides along in a slot 18. When button 11 is depressed and slid to the right the knife blade will be extended, and when depressed and slid to the left the saw blade will be extended. The two handle pieces 12 and 17 of utility tool 10 are seen in this top view.

In FIG. 2 is also seen how the two handle pieces 12 and 17 of tool 10 disassemble to replace a knife or saw blade. Hand operated screw 13 is removed and the left end of the tool handle pieces are separated. A hooked protrusion 19 of handle piece 17 slides out of a mating depression in handle piece 12. To reassemble the handle pieces these steps are reversed.

In FIG. 3 is shown a three dimensional view of the novel utility tool with knife blade 20 extended. In this Figure it can be seen that actuator button 11 has been moved in the direction of arrow D1, from its neutral position as shown in FIG. 2, to the right hand end of slot 18. Knife blade 20 is fully extended. To retract knife blade 20 locking mechanism 14 is pressed sideways by the user's forefinger while the user concurrently depresses actuator button 11 with their thumb and slides it to the left to its neutral position as shown in FIGS. 1 and 2.

Figure 4:
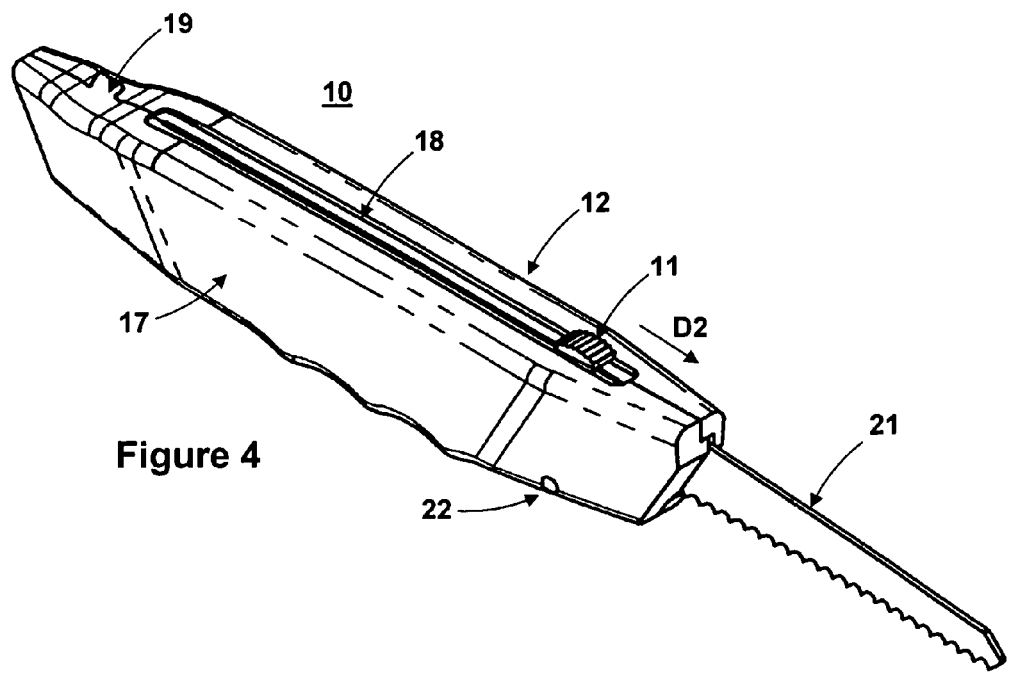
FIG. 4 shows a three dimensional view of the novel combination tool with the saw blade extended.

In FIG. 4 is shown a three dimensional view of the novel utility tool 10 with saw blade 21 extended. The drawing view shown in FIG. 4 has been rotated one-hundred eighty degrees so that the saw blade is shown extending toward the viewer, rather than away from the viewer. This has been done to more clearly see saw blade 21 extending from the end of utility tool 10.

In this Figure the two tool handles 12 and 17 are seen, as well as the hooked protrusion 19 on handle piece 17 and mating depression in handle piece 12. As previously described, these are used in conjunction with hand operated screw 13 to disassemble and reassemble tool 10. In FIG. 4 only the threaded hole 22 through handle piece 17 is seen. The threaded portion of screw 13 lies in hole 22, but otherwise screw 13 cannot be seen because it is on the backside of tool 10 in this Figure.

Actuator 11 has been moved along slot 18 from its neutral position (shown in FIGS. 1 and 2) in the direction of arrow D2 to fully extend saw blade 21. Once fully extended locking mechanism 15 (not seen in this figure) locks saw blade 21 in its extended position until locking mechanism 15 is released and actuator 11 is concurrently, manually moved along slot 18 opposite to arrow D2.

Figure 5:
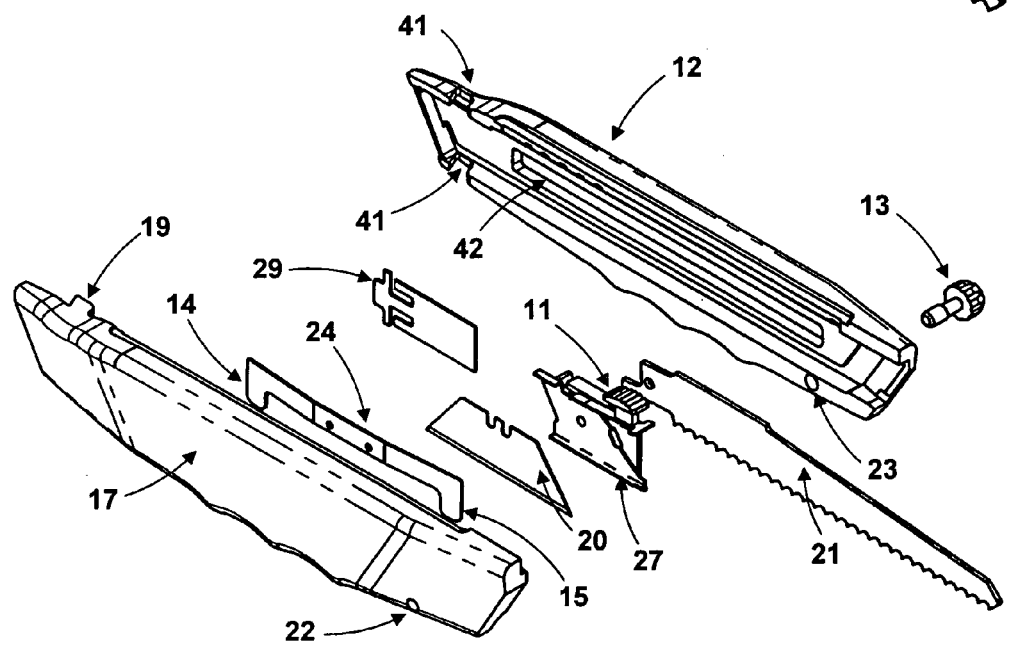
FIG. 5 shows a three dimensional exploded first view of the novel combination tool showing the parts from a first perspective.
Figure 6:
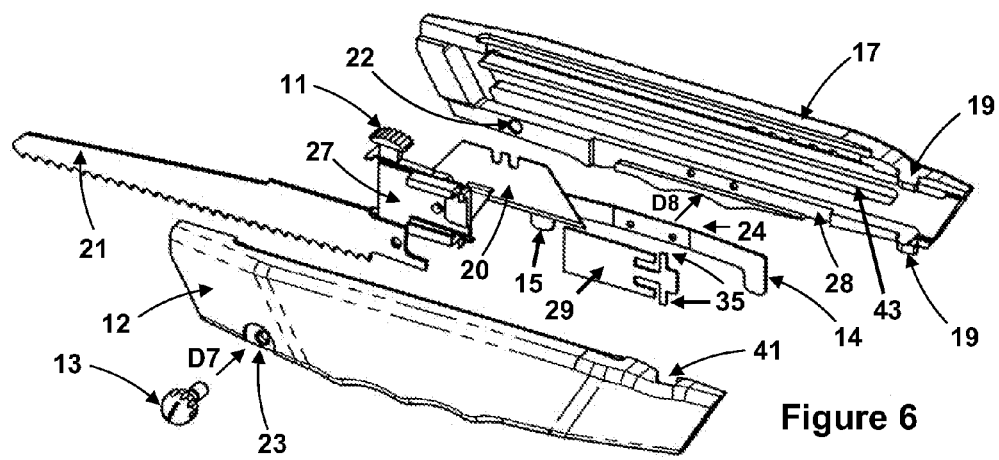
FIG. 6 shows a three dimensional exploded second view of the novel combination tool showing the parts from a second perspective.

FIG. 5 shows a three dimensional exploded first view of the novel utility tool 10 showing the parts from a first perspective, that is with saw blade 21 facing to the right. The opposite perspective exploded view is shown in FIG. 6. The two handle pieces are shown separated. Tool 10 is normally disassembled by unscrewing screw 13 from holes 22 and 23 and by unhooking hooked protrusion 19 from its mating slot 41.

One view of the interior parts of utility tool 10 is generally shown in this FIG. 5. There is a lock piece 24 which is flat piece of spring steel that is slightly bowed as shown and has two holes through its middle. The holes are used to fasten lock piece 24 on the inside bottom of handle piece 17. At the ends of lock piece 24 are two tabs 14 and 15. The left most tab 14 is the knife locking mechanism 14 and the right most tab 15 is the saw locking mechanism 15. When lock piece 24 is fastened to on the inside bottom of handle piece 17 locking mechanisms 14 and 15 do not lie against the inside of handle piece 17 but, rather, extend a small distance into the interior of assembled tool 10 where they interact with other parts of utility tool 10 to lock knife blade 20 or saw blade 21 in their extended positions.

Lock piece 24 with tabs 14 and 15 operate in the following manner to lock blade carrier 27 in one of its two extreme positions. Those positions are with knife blade 20 extended as shown in FIG. 3 and with saw blade 21 extended as shown in FIG. 4. As described in the previous paragraph tabs 14 and 15 extend a small distance into the interior of assembled tool 10.

When actuator button 11 is in its neutral position, as shown in FIG. 2, with neither blade 20 or 21 extended, blade retainer 29 is positioned internally midway between tabs 14 and 15. As actuator button 11 is moved to extend knife blade 20, tab 14 is depressed a little toward handle side piece 17 by the side of blade retainer 29. When knife blade 20 is fully extended tab 14 travels beyond blade retainer 29 and resumes its undepressed position which is now behind blade carrier 29. Thus, if an attempt is made to move actuator button 11 to retract knife blade 20, blade carrier 29 is blocked and cannot move because of tab 14 being behind carrier 29. To retract knife blade 20 tab 14 must be manually moved to the side toward handle side piece 17. A person holding tool 10 does this using their forefinger. This moves tab 14 from behind blade carrier 29 and thereby frees it to move. At the same time the person uses their thumb to move actuator button 11 towards its neutral position.

Lock tab 15 operates in the same manner to lock saw blade 21 in its extended position. As actuator button 11 is moved to extend saw blade 21 tab 15 is depressed toward handle side piece 17 by the side of blade retainer 29. With saw blade 21 is fully extended tab 15 moves behind blade retainer 29 and resumes its undepressed position which is now behind blade carrier 29. Thus, if an attempt is made to move actuator button 11 to retract saw blade 21 blade carrier 29 is blocked and cannot move because of tab 15 being behind carrier 29. To retract saw blade 21 tab 15 must manually been moved to the side, toward handle side piece 17. A person holding tool 10 does this using their forefinger. This moves tab 15 from behind blade carrier 29 and thereby frees it to move. At the same time the person uses their thumb to move actuator button 11 towards its neutral position.

There is also a blade carrier 27 a part of which is spring loaded actuator button 11. Trapezoidal shaped knife blade 20 mounts in a slot on one side of blade carrier 27 in a manner well known in the art. Saw blade 21 lies in a slot on the opposite side of blade carrier 27 and is locked therein using a saw blade retainer 29. These parts are shown in and described in greater detail with reference to FIGS. 7-12.

An opposite view of the interior parts of utility tool 10 is shown in FIG. 6. This opposite view better shows how locking piece 24 is moved in the direction of arrow D8 to be fastened into a fitted groove 28 on the inside bottom of handle piece 17. Locking piece 24 may be fastened to handle piece 17 by screws and by other fastening means well known in the art. Hand operated locking screw 13 is moved in the direction of arrow D7 and is inserted through hole 23 through handle piece 12 and its threaded shaft then turns into threaded hole 22 in handle piece 17. When hooked protrusions 19 on the top and bottom of handle piece 17 are first inserted into their mating slots 41 in the top and bottom handle piece 12 and locking screw 13 is engaged, the handle pieces 12 and 17 are firmly fastened together. In FIG. 6 the opposite side of blade carrier 27 is seen.

Figure 7:
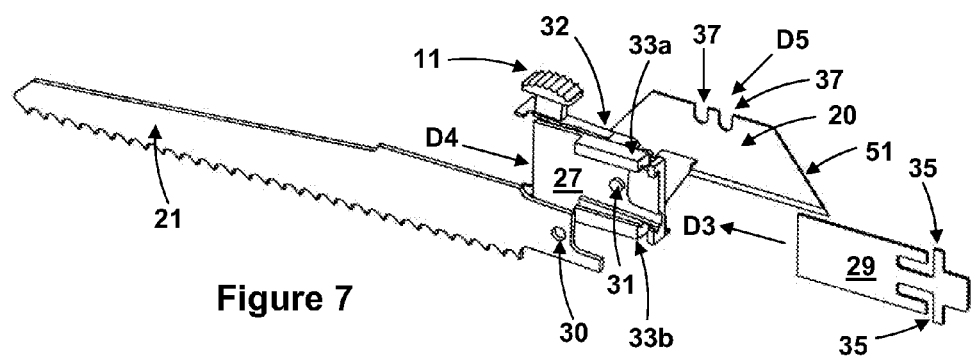
FIG. 7 is a blown up exploded view of a blade carrier with actuator button, knife blade, and the saw blade and its retainer which are inside the tool.

In FIG. 7 is shown an enlarged, more detailed view of a blade carrier 27 with actuator button 11 attached thereto by a flat spring piece 32, knife blade 20, saw blade 21 and its saw blade retainer 29. On assembly of a standard knife blade 20 to carrier 27 it is moved in the direction of arrow D5 up against the far side of blade carrier 27. Notches 37 on the top edge of knife blade 20 mate with raised portions on the far side of carrier 27 to hold trapezoidal shaped knife blade 20 in place when utility tool 10 is completely assembled. As is known in the art, if a portion of the knife edge of knife blade 20 becomes dull the knife blade may be turned over to use the opposite end of the knife edge.

To mount saw blade 21 to blade carrier 27 the base end of blade 21 with hole 30 there through is first slid in the direction of arrow D4 into the slot in the side of blade carrier 27 formed by L shaped portions 33a and 33b. The width of the slot is only slightly greater than the width of the base of saw blade 21. The depth of the slot is only slightly wider than the combined thickness of saw blade 21 and retainer 29. Hole 30 through the base of saw blade 21 is pushed down over cylindrical protrusion 31 formed in the side of blade carrier 27. The diameter of protrusion 31 is only slightly smaller than the diameter of hole 30 to facilitate this. Finally, saw blade retainer 29 is moved in the direction of arrow D3 and slides snugly into the same slot formed by L shaped portions 33a and 33b. As retainer 29 is slid into the aforementioned slot the flexible tabs 35 of the retainer are momentarily deflected until they enter slots 48 and 49 (see FIG. 10) to thereby prevent retainer 29 and saw blade 21 from inadvertently being removed from the slot and thereby from carrier 27. Retainer 29 is locked in place and this prevents saw blade 21 from being removed from carrier 27 until retainer 29 is first manually removed.

Figure 8:
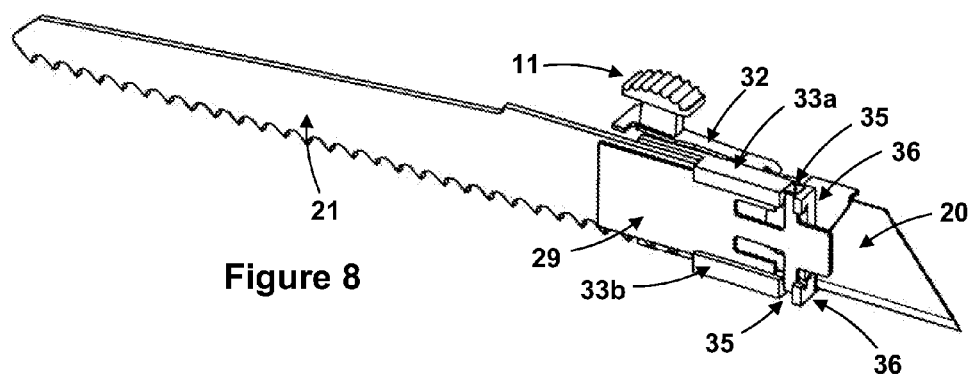
FIG. 8 is shown an assembled view of the blade carrier with actuator button, knife blade, and the saw blade and its retainer.
Figure 10:
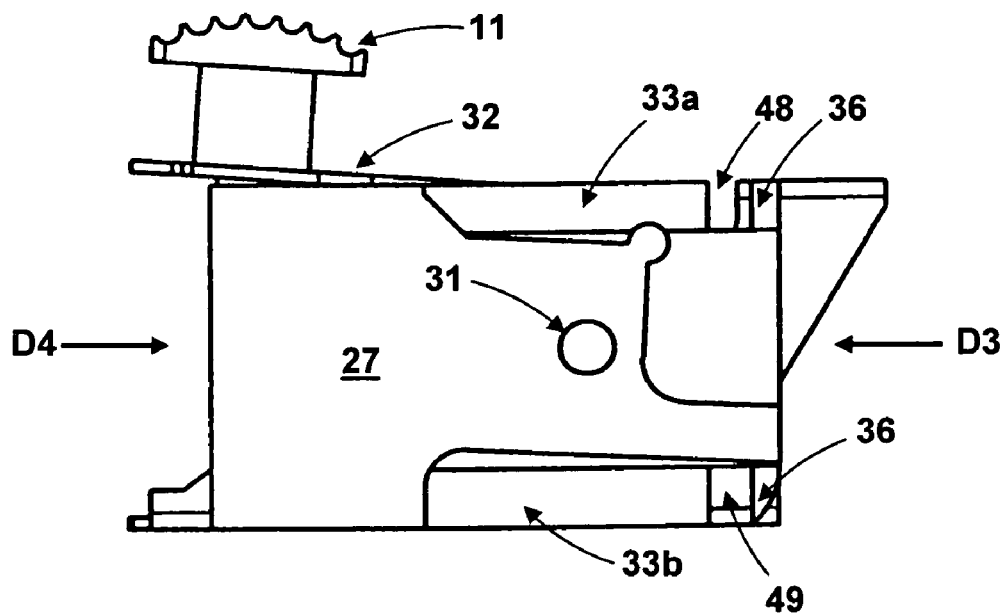
FIG. 10 is shown an enlarged second side view of the blade carrier with actuator button.

In FIG. 8 is shown an assembled view of blade carrier 27 with actuator button 11, knife blade 20, saw blade 21 and its retainer 29. This figure better shows how the tabs 35 of saw blade retainer 29 fit within the upper and lower slots 48 and 49 (see FIG. 10) formed by protrusions 36 which are part of blade carrier 27. Saw blade retainer 29 is stamped from a flat piece of spring steel so tabs 35 may be flexed up and over protrusions 36 and into the slot formed by them as shown in FIGS. 8 and 10. In this position retainer 29 cannot be withdrawn from the groove formed by L shaped portions 33a and 33b in the side of blade carrier 27 until tabs 35 are manually raised from the slots 48 and 49 formed by protrusions 36. This prevents saw blade 21 from inadvertently coming free from blade carrier 27. The assembled blade carrier 27 is assembled between handle pieces 12 and 17 and slides longitudinally along a groove 42, 43 created by them. One portion 42 of the groove is seen on the inside of first handle piece 12 in FIG. 5, and the other portion 43 of the groove is seen on the inside of the other handle piece 17 in FIG. 6. When handle pieces 12 and 17 are assembled together the two grooves 42 and 43 form a channel inside utility tool 10 in which blade carrier 27 slides when actuator 11 is depressed and pressure is applied to actuator 11 to move it along slot 18 seen in FIGS. 2, 3 and 4.

Figure 9:
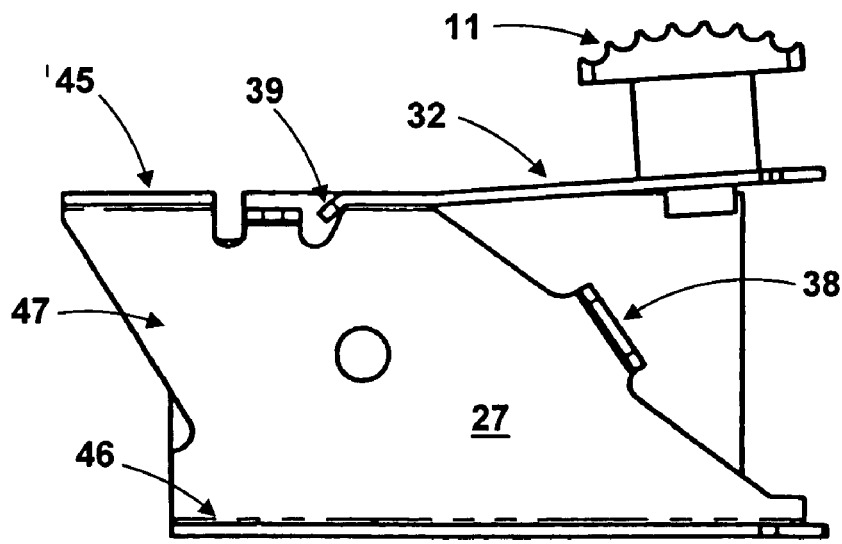
FIG. 9 is shown an enlarged first side view of the blade carrier with actuator button.

In FIG. 9 is an enlarged view of the side of blade carrier 27 on which knife blade 20 (not shown in this Figure) is mounted. There is a channel 47 on this side of carrier 27 formed by top raised edge 45 and bottom raised edge 46 which extend vertical to the page a distance equal to or slightly greater than the thickness of a knife blade 20. The vertical distance between raised edges 45 and 46 is only slightly greater than the vertical height of a knife blade 20 which is placed in channel 47 on assembly of tool 10.

There is also a raised edge 38 against which one of the sloped ends 51 of a trapezoidal shaped knife blade 20 rests when the blade is assembled to blade carrier 27. To hold a knife blade 20 in place there is a bent over tab 39. As shown in FIG. 7 knife blade 20 has two notches 37 in its top edge. Tab 39 rests in one of the two notches 37 and, if blade 20 is reversed, rests in the other of the two notches 37. When blade carrier 27 with a knife blade 20 is assembled inside the handles 12 and 17 of tool 10 blade 20 is held against carrier 27 and cannot move away from carrier 27 is a direction perpendicular to blade carrier 27 in FIG. 9.

In FIG. 10 is an enlarged view of the side of blade carrier 27 to which saw blade 21 is attached. There is seen top L shaped piece 33a and bottom L shaped piece 33b that are better seen in FIGS. 7 and 8. L shaped pieces 33a and 33b form a slot into which the base of a saw blade 21 is slid in the direction of arrow D4. As previously described the thickness (depth into the page of FIG. 10) of the slot is only slightly thicker than the combined thickness of saw blade 21 and saw blade retainer 29. Circular hole 30 through the base of saw blade 21 (See FIG. 8) is pushed down over cylindrical protrusion 31 on the side of saw blade carrier 27. The diameter of protrusion 31 is only slightly smaller than the diameter of hole 30 to facilitate this. Finally, saw blade retainer 29 is moved in the direction of arrow D3 and slides snugly into the same slot formed by L shaped portions 33a and 33b and is locked therein by its spring tabs 35 as seen in FIG. 8. The spring tabs 35 (not shown in FIG. 10) rest in upper 48 and lower 49 slots formed by protrusions 36 which are part of blade carrier 27. FIGS. 7 and 8 show other details.

Figure 11:
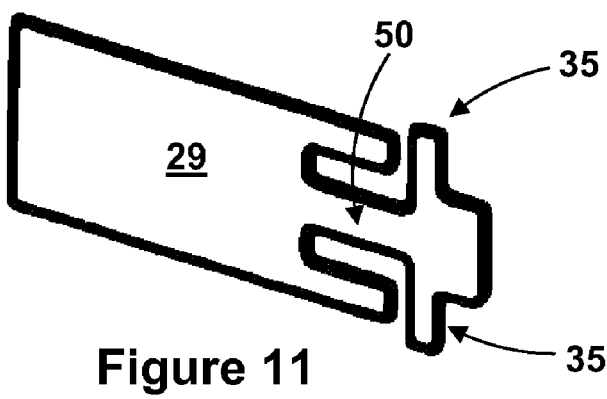
FIG. 11 is shown an enlarged view of a retainer that fastens the saw blade to the blade carrier.

In FIG. 11 is shown an enlarged view of saw blade retainer 29. Retainer 29 is stamped out of a piece of spring type steel. Its has two tabs 35 that are connected to the main part of retainer 29 by a connecting piece 50 that can flex due to the material that the retainer is made of. As previously described, when saw blade retainer 29 is fully inserted into the slot described in the previous paragraph its tabs 35 flex upward and come to rest in the upper 48 and lower 49 slots formed by protrusions 36 as shown in FIG. 8. This locks saw blade 21 to blade carrier 27. To remove saw blade 21 from blade carrier 27 the tabs 35 are manually flexed out of upper and lower slots 48, 49 and retainer 29 is manually slid in a direction opposite to arrow D3 to remove it from the slot formed by L shaped portions 33a and 33b as shown in FIGS. 7 and 8.

Figure 12:
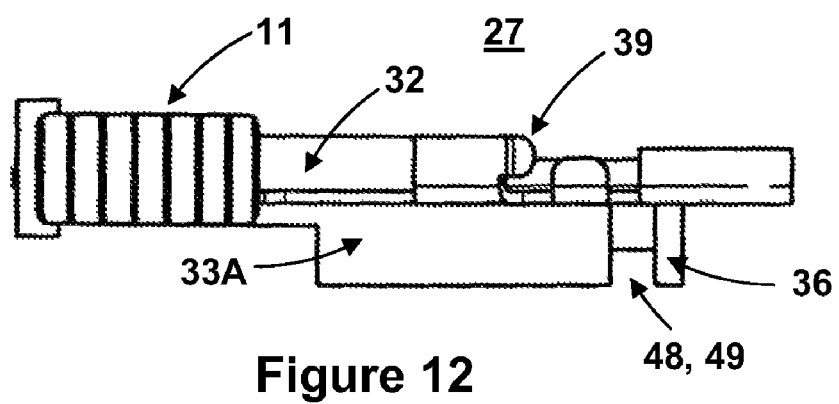
FIG. 12 is shown an enlarged top view of the blade carrier with actuator button.

In FIG. 12 is shown a top view of blade carrier 27. Actuator 11 is shown connected to retainer 27 by way of a flat spring 32. As previously described tab 39 rests in one of the two notches 37 of knife blade 20 to hold it to blade carrier 27. The top of L shaped portion 33a is seen. Upper protrusion 36 that forms upper slot 48 is also seen. Tabs 35 of saw blade retainer 29 lie in slots 48 and 49 to fasten saw blade 21 to blade carrier 27 as previously described.

While what has been described hereinabove is the preferred embodiment of the invention it will be apparent to those skilled in the art that numerous changes may be made without departing from the spirit and scope of the invention. The means by which the blade locks are implemented may be changed while still safely locking knife blades and saw blades in their extended positions. In addition, while tool 10 is disclosed with a knife blade and a saw blade other tool combinations may be implemented, such as two saw blades. In addition, the manner by which saw blades are fastened to the blade carrier may be varied.

What is claimed is:

1. A combination retractable saw blade and knife blade utility tool comprising:
   (a) an elongated handle having two ends and comprising a first handle half having an inner wall and an outer wall and the inner wall of the first handle half has a first groove therein, and a second handle half having an inner wall and an outer wall and the inner wall of the second handle half has a second groove therein, when the first and second handle halves are assembled together they define a hollow space inside the handle between the two handle halves, and the first groove and the second groove are parallel to each other and form a channel,
   wherein the assembled handle has a top with a first slot through and along most of a length of the handle that communicates with the hollow space, a second slot through one of the two ends of the handle that communicates with the hollow space and a third slot through the other of the two ends of the handle that communicates with the hollow space;

(b) a carrier to which the saw blade and knife blade are fastened, the carrier being mounted inside the hollow space of the handle and being movable in the channel formed by the first and second grooves, wherein as the carrier is moved from one end of the handle hollow space to an opposite end of the handle hollow space the knife blade extends through the second slot to be utilized or the saw blade extends through the third slot to be utilized, wherein the carrier has a first side facing the first handle half and a second side facing the second handle half and has a first channel along the first side, wherein there is a protrusion in the first channel, wherein the first channel has an upper lip and a lower lip, wherein the saw blade has a base with a hole through it, wherein to fasten the saw blade to the carrier the base of the saw blade is inserted into the channel until the hole through the base of the saw blade is placed over and onto the protrusion in the first channel and in this position movement of the saw blade is constrained by the first channel upper and lower lip and the protrusion;

(c) a retainer that is inserted into the first channel after the saw blade is positioned therein and the retainer assists with the upper and lower lips of the first channel and the protrusion in the first channel of the carrier to prevent the saw blade from inadvertently being removed from the first channel and thereby from the carrier;

wherein the carrier has a first slot and the retainer has a flexible tab, and when the retainer is inserted into the first channel of the carrier after the saw blade is inserted therein, the flexible tab of the retainer is momentarily deflected until it enters the first slot to thereby prevent the retainer and the saw blade from inadvertently being removed from the first channel and thereby from the carrier;

(d) an actuator button external to the handle and being attached through the first slot to the carrier inside the handle hollow space, the actuator button being moved along the first slot to move the carrier from the one end to the opposite end of the handle hollow space to extend and utilize either the knife blade or the saw blade; and (e) a lock mechanism for both locking the knife blade in an extended position and locking the saw blade in an extended position, and to retract either the knife blade or the saw blade inside the handle hollow space the lock mechanism must be operated at the same time that the actuator button is moved to withdraw the knife blade or the saw blade inside the handle hollow space.

2. The combination retractable saw blade and knife blade utility tool of claim 1 wherein the knife blade is mounted against the second side of the carrier.

3. The combination retractable saw blade and knife blade utility tool of claim 1 wherein the handle has a bottom with two openings there through that communicate with the hollow space, wherein the lock mechanism is attached to the inner wall of one of the two handle halves, the lock mechanism has a first tab that extends through a first of the two openings through the bottom of the handle and a second tab that extends through a second of the two openings through the bottom of the handle, the first tab locking the knife blade in its extended position until the first tab is depressed at the same time that the actuator button is moved to withdraw the knife blade inside the handle, and the second tab locking the saw blade in its extended position until the second tab is depressed at the same time that the actuator button is moved to withdraw the saw blade inside the handle.

4. The combination retractable saw blade and knife blade utility tool of claim 3 wherein the saw blade has a base with a hole through it, wherein the carrier has a first side facing the first handle half and a second side facing the second handle half and has a first channel along the first side, wherein there is a protrusion in the first channel, wherein the first channel has an upper lip and a lower lip, wherein to fasten the saw blade to the carrier the base of the saw blade is inserted into the channel until the hole through the base of the saw blade is placed over and onto the protrusion in the first channel and in this position movement of the saw blade is constrained by the first channel upper and lower lip and the protrusion, and further comprising a retainer that is inserted into the first channel after the saw blade is positioned therein and the retainer assists with the upper and lower lips of the first channel and the protrusion in the first channel of the carrier to prevent the saw blade from inadvertently being removed from the first channel and thereby from the carrier.

* * * * *